US012418139B2

(12) United States Patent
Yamada

(10) Patent No.: US 12,418,139 B2
(45) Date of Patent: Sep. 16, 2025

(54) RUBBER PLUG UNIT AND CONNECTOR

(71) Applicant: SUMITOMO WIRING SYSTEMS, LTD., Mie (JP)

(72) Inventor: Hiroki Yamada, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 333 days.

(21) Appl. No.: 18/008,030

(22) PCT Filed: May 21, 2021

(86) PCT No.: PCT/JP2021/019397

§ 371 (c)(1),
(2) Date: Dec. 2, 2022

(87) PCT Pub. No.: WO2021/251106

PCT Pub. Date: Dec. 16, 2021

(65) Prior Publication Data

US 2023/0299537 A1 Sep. 21, 2023

(30) Foreign Application Priority Data

Jun. 9, 2020 (JP) ................................ 2020-099763

(51) Int. Cl.

*H01R 13/52* (2006.01)
*H01R 4/18* (2006.01)
*H01R 13/40* (2006.01)

(52) U.S. Cl.

CPC ........... *H01R 13/5221* (2013.01); *H01R 4/18* (2013.01); *H01R 13/40* (2013.01)

(58) Field of Classification Search

CPC ...... H01R 13/5221; H01R 4/18; H01R 13/40; H01R 13/5205

USPC .......................................................... 439/271

See application file for complete search history.

(56) References Cited

U.S. PATENT DOCUMENTS

| | | | | |
|---|---|---|---|---|
| 10,177,498 | B1 * | 1/2019 | Yi | H01R 13/514 |
| 2005/0221672 | A1 | 10/2005 | Tsuchjya et al. | |
| 2013/0008714 | A1 | 1/2013 | Morikawa et al. | |
| 2013/0126234 | A1 | 5/2013 | Ono et al. | |

(Continued)

FOREIGN PATENT DOCUMENTS

| | | | |
|---|---|---|---|
| JP | 2012-104236 A | | 5/2012 |
| JP | 2015099639 A | * | 5/2015 |

(Continued)

OTHER PUBLICATIONS

International Search Report issued on Aug. 17, 2021 for WO 2021/251106 A1 (6 pages).

*Primary Examiner* — Tulsidas C Patel
*Assistant Examiner* — Jeffrey Mountain
(74) *Attorney, Agent, or Firm* — Venjuris, P.C.

(57) ABSTRACT

A rubber plug unit (10, 10A, 10B) is provided with a terminal (13, 13A, 14, 14A), a wire (11) and a rubber plug (12, 12A, 12B) to be held in close contact with the outer periphery of the wire (11). The wire (11) includes an electrically conductive portion (22) to be connected to the terminal (13, 13A, 14, 14A). The rubber plug (12, 12A, 12B) includes a holding portion (17) to be sandwiched between the terminal (13, 13A, 14, 14A) and the wire (11). The electrically conductive portion (22) and the holding portion (17) are arranged to overlap in an axial direction (X) of the wire (11).

7 Claims, 8 Drawing Sheets

(56) References Cited

U.S. PATENT DOCUMENTS

| | | | |
|---|---|---|---|
| 2016/0248194 | A1 | 8/2016 | Ii et al. |
| 2019/0089089 | A1 | 3/2019 | Hashimoto et al. |

FOREIGN PATENT DOCUMENTS

| | | | |
|---|---|---|---|
| JP | 2016-095915 | A | 5/2016 |
| JP | 2017-216202 | A | 12/2017 |

* cited by examiner

RUBBER PLUG UNIT AND CONNECTOR

CROSS REFERENCE TO RELATED APPLICATIONS

This application is a national phase of PCT application No. PCT/JP2021/019397, filed on 21 May 2021, which claims priority from Japanese patent application No. 2020-099763, filed on 9 Jun. 2020, all of which are incorporated herein by reference.

BACKGROUND OF THE INVENTION

Field of the Invention

The present disclosure relates to a rubber plug unit and a connector.

Description of Related Art

A connector disclosed in Patent Document 1 is provided with a wire to be held by a wire barrel portion and an insulation barrel portion of a terminal and a rubber plug (sealing body) integrally provided to the wire and the terminal to cover the insulation barrel portion.

A connector disclosed in Patent Document 2 is provided with a wire to be connected to a wire connecting portion of a terminal and a rubber plug (sealing body), through which the wire is inserted.

PRIOR ART DOCUMENT

Patent Document

Patent Document 1: JP 2015-090843 A
Patent Document 2: JP 2017-216202 A

SUMMARY OF THE INVENTION

In the case of Patent Document 1 and Patent Document 2, there is a concern that the rubber plug is shifted in an axial direction with respect to the wire. In contrast, it is also possible to adopt a configuration for restricting a position shift of the rubber plug with respect to the wire by holding the rubber plug between the insulation barrel portion of the terminal and the wire. However, if a part where the rubber plug is held by the insulation barrel portion and a part where the wire is connected by the wire barrel portion are provided side by side in the axial direction, there is a concern for the enlargement of a unit including the rubber plug and the connector.

Accordingly, the present disclosure aims to provide a rubber plug unit and a connector avoiding enlargement.

The present disclosure is directed to a rubber plug unit with a terminal, a wire, and a rubber plug to be held in close contact with an outer periphery of the wire, the wire including an electrically conductive portion to be connected to the terminal, the rubber plug including a holding portion to be sandwiched between the terminal and the wire, and the electrically conductive portion and the holding portion being arranged to overlap in an axial direction of the wire.

According to the present disclosure, it is possible to provide a rubber plug unit and a connector avoiding enlargement.

DETAILED DESCRIPTION OF THE INVENTION

Figure 1:
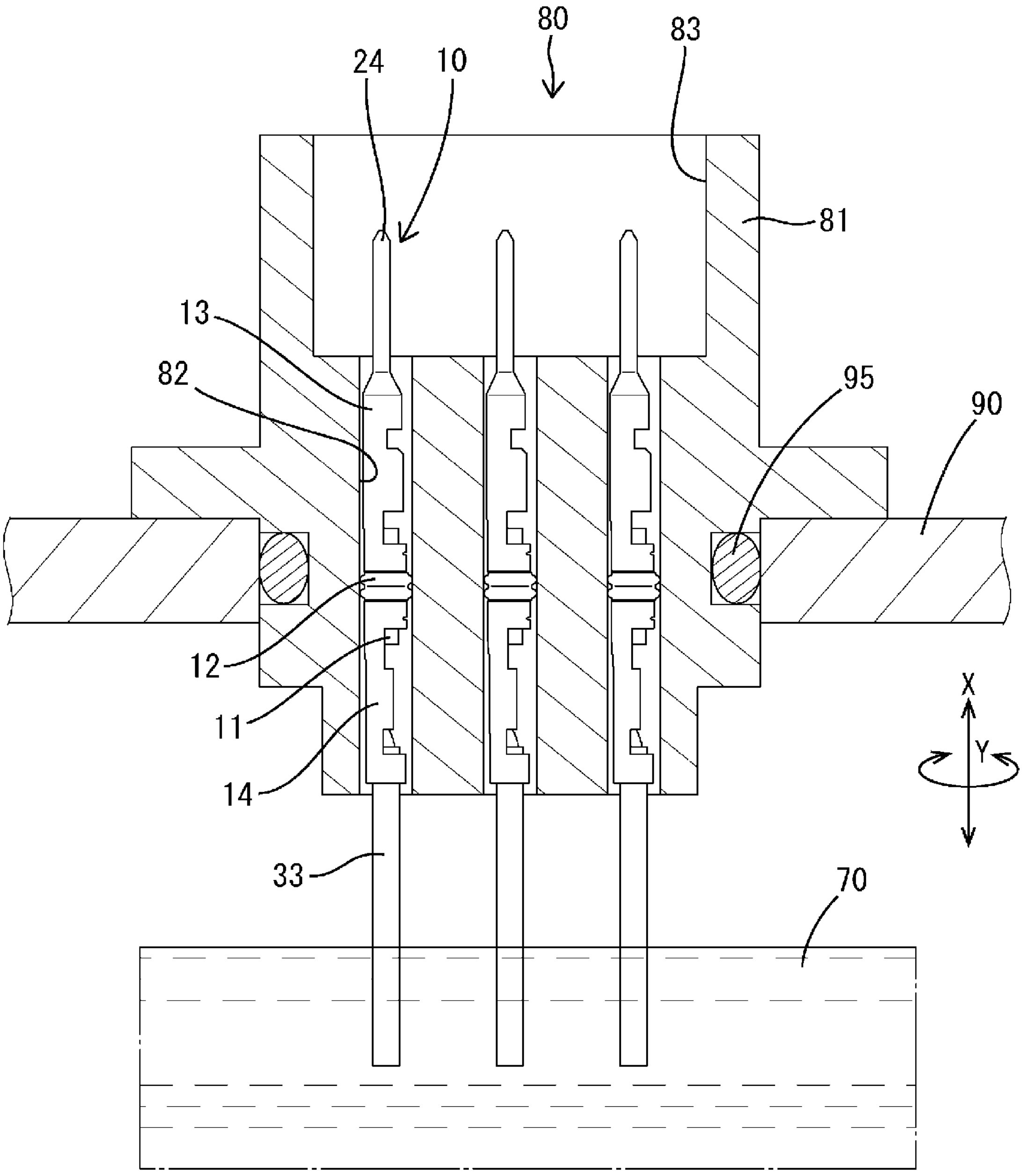
FIG. 1 is a schematic diagram of a connector mounted on a case in a first embodiment.

First, embodiments of the present disclosure are listed and described.

(1) The rubber plug unit of the present disclosure is provided with a terminal, a wire, and a rubber plug to be held in close contact with an outer periphery of the wire, the wire including an electrically conductive portion to be connected to the terminal, the rubber plug including a holding portion to be sandwiched between the terminal and the wire, and the electrically conductive portion and the holding portion being arranged to overlap in an axial direction of the wire. If the electrically conductive portion and the holding portion are arranged to overlap in the axial direction of the wire in this way, the enlargement of the rubber plug unit in the axial direction can be avoided.

(2) Preferably, the wire is a single core wire. Since the single core wire is rigid to maintain a fixed shape, a state where the electrically conductive portion and the holding portion are arranged to overlap can be satisfactorily maintained.

(3) The electrically conductive portion and the holding portion may be arranged side by side in a circumferential direction of the wire, and the terminal may include a collective barrel portion for collectively surrounding the electrically conductive portion and the holding portion. According to this configuration, the collective barrel portion can have both a function of being connected to the wire (function of a wire barrel portion) and a function of holding the rubber plug (function of an insulation barrel portion). As a result, an entire length of the terminal in the axial direction can be shortened as compared to a known terminal in which a wire barrel portion and an insulation barrel portion are provided side by side in the axial direction.

(4) A protrusion configured to contact the electrically conductive portion may be provided on an inner periphery of the collective barrel portion. According to this configuration, the terminal can satisfactorily contact the electrically conductive portion via the protrusion.

(1) A connector of the present disclosure is provided with the above rubber plug unit and a connector housing including a cavity, the wire being a single core wire, and a sealing lip to be held in close contact with an inner periphery of the cavity being provided on an outer periphery of the rubber plug. According to this configuration, liquid-tight sealing can be provided between the rubber plug and the connector housing and the inside of the wire can be maintained liquid-tight. As a result, the intrusion of oil and the like to a surface side of the connector to be connected to a mating connector can be blocked.

(2) Preferably, the electrically conductive portions are arranged on both sides across the sealing lip in the axial direction of the wire, a connection terminal capable of contacting a mating terminal is connected to one electrically conductive portion, out of the electrically conductive portions arranged on the both sides, and a joint terminal coupled to a flexible coated wire is connected to the other electrically conductive portion, and the coated wire is arranged outside the connector housing. Since the flexible coated wire is arranged outside the connector housing, a degree of freedom in wire routing can be enhanced. Even if oil or the like enters the inside of the coated wire, the intrusion of the oil or the like to the connection terminal side can be blocked since liquid-tight sealing can be provided between the rubber plug and the connector housing and the inside of the wire can be maintained liquid-tight. As a result, the connection reliability of the connection terminal and the mating terminal can be ensured.

Specific examples of the present disclosure are described below with reference to the drawings. Note that the present invention is not limited to these illustrations, but is represented by claims, and is intended to include all changes in the scope of claims and in the meaning and scope of equivalents.

First Embodiment

A rubber plug unit 10 of a first embodiment is, for example, provided in a connector 80 mounted on a case 90 of an automatic transmission of an automotive vehicle via an O-ring 95 as shown in FIG. 1. The connector 80 includes a connector housing 81 made of synthetic resin. The rubber plug unit 10 is provided with a wire 11, a rubber plug 12 and terminals 13, 14. The terminals 13, 14 include a connection terminal 13 and a joint terminal 14. The rubber plug 10 is accommodated into a cavity 82 of the connector housing 81. The connector housing 81 is connected to an unillustrated mating connector housing. The connection terminal 13 is electrically connected to an unillustrated mating terminal accommodated in the mating connector housing. Note that X, Y in each figure represent an axial direction X and a circumferential direction Y. The axial direction X corresponds to a longitudinal direction of the rubber plug unit 10 and an extending direction of the wire 11. The circumferential direction Y is a direction about an axis and corresponds to a direction along the outer periphery of the wire 11. Further, in the following description, a “front side” in the axial direction X is an upper side of FIG. 1 and a left side of FIG. 2, i.e. a side to be connected to the mating connector housing. A “rear side” in the axial direction X is opposite to the “front side” and corresponds to a lower side of FIG. 1 and a right side of FIG. 2. In the case of the first embodiment, the connection terminal 13 is located forward of the joint terminal 14 in the axial direction X. These directions are set for the convenience of description and do not limit directions in actual use.

The wire 11 is configured as a single core wire having no insulation coating. The wire 11 has a cylindrical shape and is rigid to maintain a fixed shape. In the case of the first embodiment, the wire 11 is shaped to linearly extend in the axial direction X (lateral direction of FIG. 2).

Figure 2:
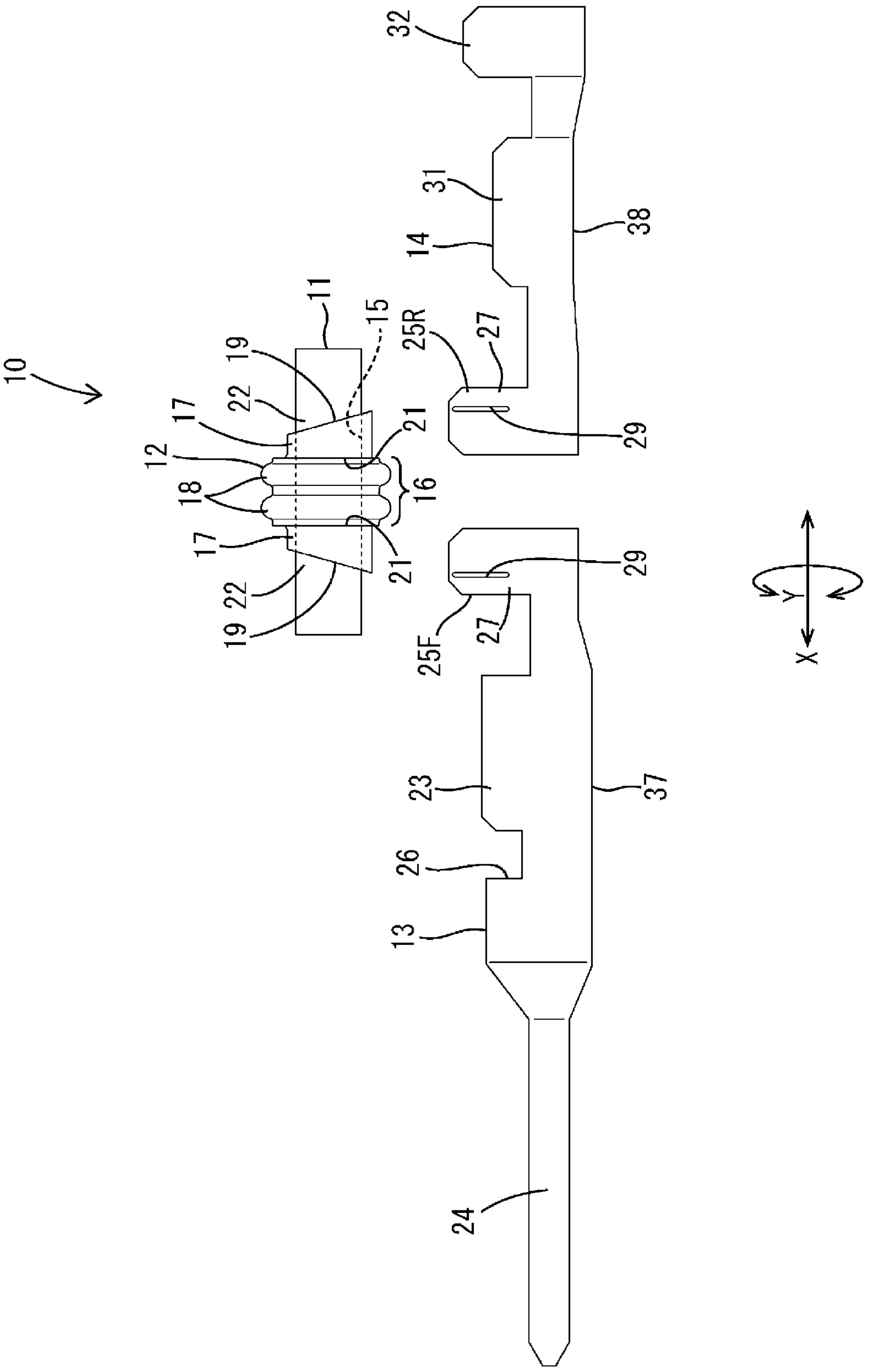
FIG. 2 is an exploded side view of the rubber plug unit.
Figure 5:
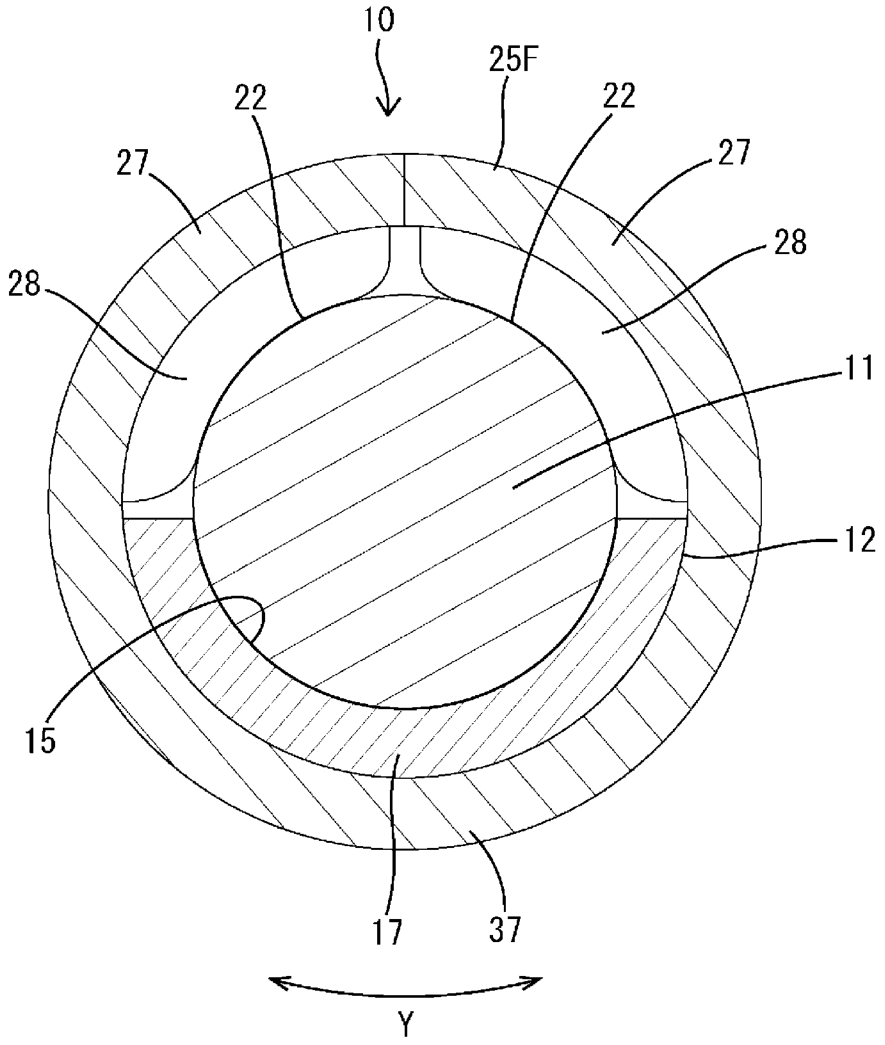
FIG. 5 is a section along A-A of FIG. 4.

The rubber plug 12 is made of an oil-resistant rubber material. The rubber plug 12 has a hollow cylindrical shape as a whole and is arranged with an axis oriented in the axial direction X of the wire 11. As shown in FIG. 5, a sealing hole 15 is provided to penetrate in the axial direction X in a center of the rubber plug 12. As shown in FIG. 2, the rubber plug 12 includes a sealing body 16 and a pair of holding portions 17 connected to both sides in the axial direction X of the sealing body 16.

A plurality of sealing lips 18 are provided to project on the outer periphery of the sealing body 16. The respective sealing lips 18 are provided side by side in the axial direction X on the outer periphery of the sealing body 16. The respective sealing lips 18 are provided over the entire outer periphery of the sealing body 16. A plurality of unillustrated inner peripheral lips are provided on the inner periphery of the sealing hole 15 of the sealing body 16.

The wire 11 is inserted into the sealing hole 15 of the rubber plug 12 in a liquid-tight manner. Each inner peripheral lip is compressed into close contact with the outer periphery of the wire 11. In this way, liquid-tight sealing is provided between the rubber plug 12 and the wire 11. As described above, the wire 11 is a single core wire and has no gap inside. Thus, the inside of the wire 11 is also maintained liquid-tight.

As shown in FIG. 2, the respective holding portions 17 project toward mutually opposite sides from end surfaces on both sides in the axial direction X of the sealing body 16. The sealing hole 15 is so configured not to include inner peripheral lips on the sides of the holding portions 17 and have a hole diameter equal to or smaller than an outer diameter of the wire 11. The holding portion 17 is formed to have a fixed thickness (thickness in a radial direction) in the axial direction X. The thickness of the holding portion 17 is smaller than a thickness of the sealing body 16 (minimum thickness in the radial direction of the sealing body 16 (e.g. a thickness of a valley part between the respective sealing lips 18 in the case of including no inner peripheral lips)).

The holding portion 17 is shaped to gradually reduce a projection amount from the end surface in the axial direction X of the sealing body 16 from a lower end (one end in the radial direction) to an upper end (other end in the radial direction) of FIG. 2. The tip of the holding portion 17 in a projecting direction is an inclined edge 19 inclined to approach the sealing body 16 from a lower end to an upper end of FIG. 2. The holding portion 17 has a trapezoidal shape in a side view orthogonal to the axial direction X by upper and lower edges parallel to each other, a coupling edge 21 connected to the end surface in the axial direction X of the sealing body 16 and the inclined edge 19. The respective holding portions 17 have the same shape and are shaped line-symmetrically across the sealing body 16.

Figure 4:
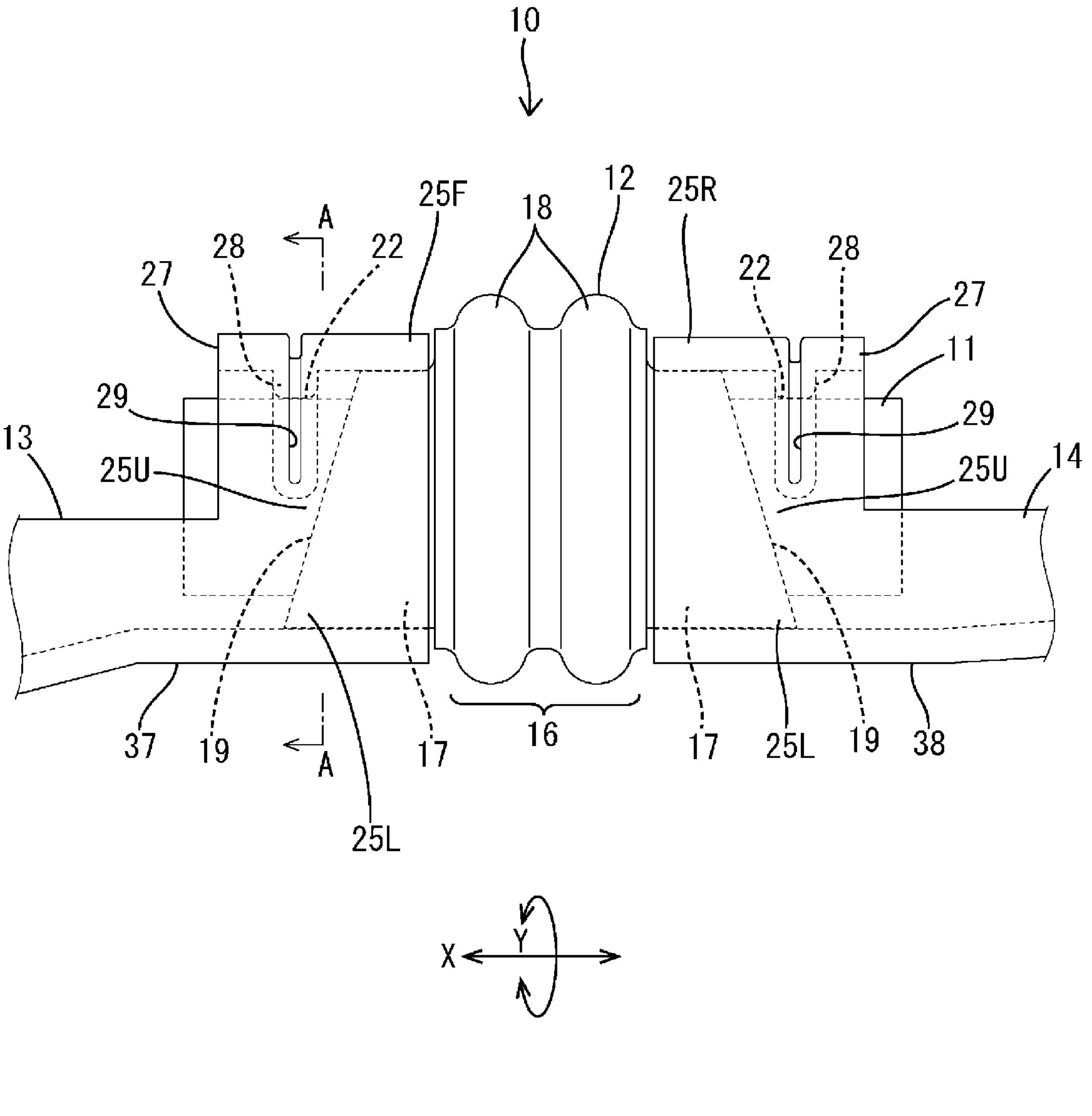
FIG. 4 is an enlarged side view of a main part of the rubber plug unit.

As shown in FIG. 2, in the wire 11, electrically conductive portions 22 are exposed at positions overlapping the holding portions 17 in the axial direction X. The electrically conductive portions 22 are located above the inclined edges 19 of the holding portions 17 and, as shown in FIG. 4, electrically connected to the terminals 13, 14. The electrically conductive portion 22 is a region of the outer periphery of the wire 11 and has no special shape.

The holding portions 17 receive crimping forces of the terminals 13, 14 and are held in a state sandwiched and positioned between the terminals 13, 14 and the wire 11.

The connection terminal 13 is formed, such as by bending a metal plate material and, as shown in FIG. 2, has an elongated shape in the axial direction X as a whole. The connection terminal 13 includes a tubular body portion 23, a tab 24 projecting forward (leftward of FIG. 2) in the axial direction X from the body portion 23 and a collective barrel portion 25F connected to a rear side (right side of FIG. 2) of the body portion 23. The body portion 23 includes a recess-like lock receiving portion 26 to be locked by an unillustrated locking structure of the connector housing 81.

The tab 24 is connectable to the unillustrated mating terminal. The collective barrel portion 25F includes a pair of crimping pieces 27 rising from a rear end part of a bottom wall 37 continuous from the body portion 23 while facing each other. Bead-like protrusions 28 extending in the circumferential direction Y are provided on the inner surfaces of the crimping pieces 27 as shown in FIG. 5. As shown in FIG. 2, recesses 29 are provided at positions corresponding to the protrusions 28 in the outer surfaces of the crimping pieces 27. The protrusions 28 and the recesses 29 are formed by applying press-working to the outer surfaces of the crimping pieces 27.

The joint terminal 14 is formed, such as by bending a metal plate material and, as shown in FIG. 2, has an elongated shape in the axial direction X as a whole. A length in the axial direction X of the joint terminal 14 is set shorter than that of the connection terminal 13.

The joint terminal 14 includes a collective barrel portion 25R located on a front side in the axial direction X, a wire barrel portion 31 connected behind the collective barrel portion 25R and an insulation barrel portion 32 located behind the wire barrel portion 31. The collective barrel portion 25R includes a pair of crimping pieces 27 rising from a front end part of a bottom wall 38 while facing each other. The collective barrel portion 25R is shaped similarly to the collective barrel portion 25F of the connection terminal 13 and includes, as shown in FIG. 4, protrusions 28 on an inner surface and recesses 29 in an outer surface. The wire barrel portion 31 and the insulation barrel portion 32 are in the form of open barrels and, as shown in FIG. 1, coupled to a coated wire 33. The coated wire 33 is flexible and includes a plurality of strands and a coating surrounding the respective stands. The wire barrel portion 31 is crimped and connected to the respective strands exposed by removing the coating in an end part of the coated wire 33. The insulation barrel portion 32 is crimped and connected to the coating in the end part of the coated wire 33.

The collective barrel portion 25F of the connection terminal 13 collectively surrounds the holding portion 17 and the electrically conductive portions 22 on a front side in the axial direction X. The collective barrel portion 25R of the joint terminal 14 collectively surrounds the holding portion 17 and the electrically conductive portions 22 on a rear side in the axial direction X.

The collective barrel portions 25F, 25R are arranged in contact with or in proximity to outer peripheral parts of the end surfaces in the axial direction X of the sealing body 16. As shown in FIG. 5, the respective crimping pieces 27 and the bottom wall 37 are deformed into a circular shape or a flat shape close to a circular shape along the holding portion 17 and the electrically conductive portions 22 by crimping.

As shown in FIG. 4, a rear end side of the collective barrel portion 25F and a front end side of the collective barrel portion 25R are crimped to the holding portions 17 over an entire circumference. A central side in the axial direction X of the collective barrel portion 25F, 25R has a lower region 25L to be crimped to the outer periphery of a tip side (side having the inclined edge 19) of the corresponding holding portion 17 and an upper region 25U to be crimped to the electrically conductive portions 22 of the wire 11 via the protrusions 28. The protrusions 28 are in contact with the electrically conductive portions 22 of the wire 11 along the circumferential direction Y. The lower region 25L of the collective barrel portion 25F reduces a contact region with the holding portion 17 toward a front side. The lower region 25L of the collective barrel portion 25R reduces a contact region with the holding portion 17 toward a rear side.

Next, the overall structures of the rubber plug unit 10 and the connector 80 of the first embodiment are described.

In assembling, the wire 11 is inserted through the sealing hole 15 of the rubber plug 12. A central side in the axial direction X of the outer periphery of the wire 11 is arranged in close contact with the inner periphery of the sealing hole 15 of the rubber plug 12. As shown in FIG. 2, both sides in the axial direction X of the outer periphery of the wire 11, including the electrically conductive portions 22, are exposed from both sides in the axial direction X of the rubber plug 12.

Subsequently, the collective barrel portions 25F, 25R of the terminals 13, 14 are crimped and connected to the both sides in the axial direction X of the wire 11. As shown in FIG. 4, in a fixed width in the axial direction X of the collective barrel portion 25F, 25R, the lower region 25L is crimped to the holding portion 17 of the rubber plug 12 and the upper region 25U is crimped to the electrically conductive portions 22 of the wire 11 via the protrusions 28. By crimping the lower regions 25L of the collective barrel portions 25F, 25R to the holding portions 17 of the rubber plug 12, the holding portions 17 are sandwiched and held between the collective barrel portions 25F, 25R and the wire 11 to restrict a position shift of the rubber plug 12 with respect to the wire 11. By the contact of the protrusions 28 of the upper regions 25U of the collective barrel portions 25F, 25R with the electrically conductive portions 22 of the wire 11, the connection terminal 13 and the joint terminal 14 are conductively connected via the wire 11. Further, the connection terminal 13 is conductively connected to the coated wire 33 via the joint terminal 14.

Figure 3:
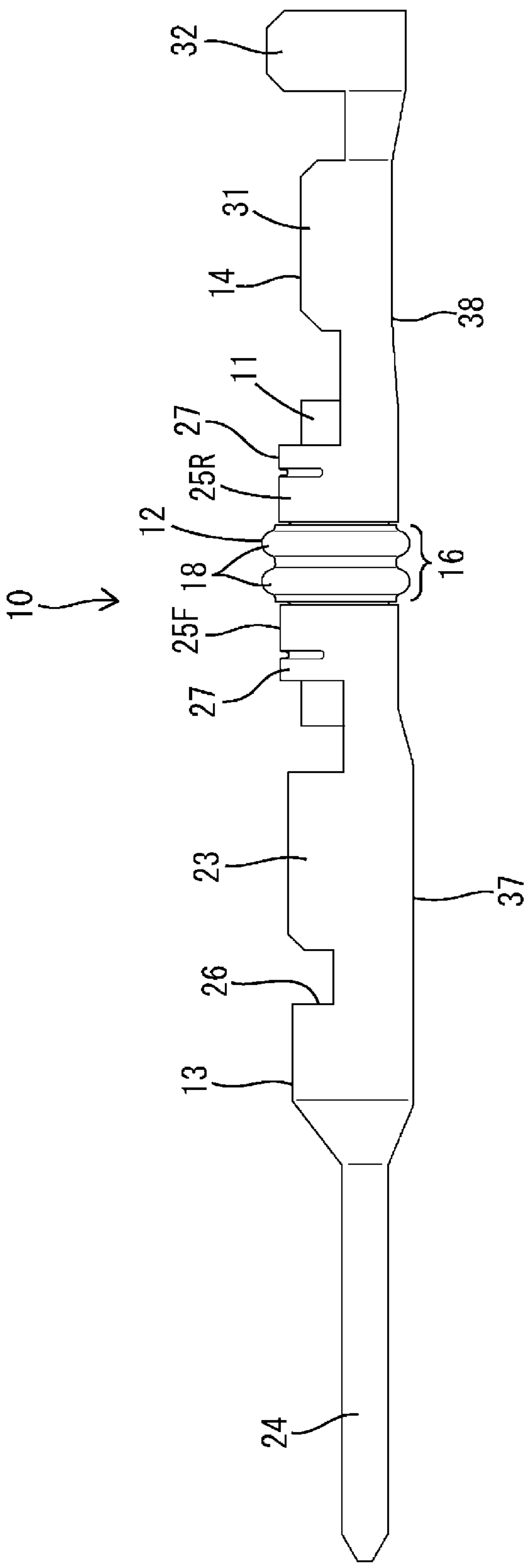
FIG. 3 is a side view of the rubber plug unit.

In the above way, the rubber plug unit 10 is obtained in which the wire 11, the rubber plug 12 and the terminals 13, 14 are integrated as shown in FIG. 3. As shown in FIG. 1, the rubber plug unit 10 is inserted into the cavity 82 of the connector housing 81. Each sealing lip 18 of the rubber plug 12 is compressed into close contact with the inner periphery of the cavity 82 of the connector housing 81. In this way, liquid-tight sealing is provided between the rubber plug 12 and the connector housing 81. The tab 24 of the connection terminal 13 is arranged to project into a fitting space 83 (space into which the mating connector housing is fit) of the connector housing 81. The coated wire 33 is pulled out to outside, which is a lower side of FIG. 1, from the connector housing 81. An end part of the coated wire 33 can be, for example, immersed in oil 70 pooled in an oil pan or the like. The oil 70 may reach the wire 11 of the rubber plug unit 10 by a capillary phenomenon along gaps between the strands of the coated wire 33. However, in the case of the first embodiment, there is no gap inside the wire 11, which is a single core wire, and sealing is provided between the wire 11 and the connector housing 81 by the rubber plug 12. Thus, the oil 70 is effectively prevented from reaching the side of the connection terminal 13. As a result, the intrusion of the oil 70 to the tab 24 of the connection terminal 13 can be avoided, and the connection reliability of the connection terminal 13 and the mating terminal can be improved.

On the other hand, there is a concern that the rubber plug unit 10 becomes long in the axial direction X due to the presence of the wire 11, which is a single core wire, and the rubber plug 12 on a central side in the axial direction X of the rubber plug unit 10. However, since the electrically conductive portions 22 and the holding portions 17 are arranged to overlap in the axial direction X in the case of the first embodiment, a length in the axial direction X of the rubber plug unit 10 can be shortened as compared to the case where the electrically conductive portions 22 and the holing portions 17 are arranged side by side in the axial direction X. Moreover, as shown in FIG. 5, the electrically conductive portions 22 and the holding portions 17 are arranged side by side in the circumferential direction Y of the wire 11, and the collective barrel portions 25F, 25R are crimped to collectively surround the electrically conductive portions 22 and the holding portions 17. Thus, lengths in the axial direction X of the terminals 13, 14 can be shortened as compared to the case where a wire barrel portion and an insulation barrel portion are provided side by side in the axial direction X. As a result, the enlargement of the rubber plug unit 10 can be effectively avoided. Particularly, since the protrusions 28 to be held in contact with the electrically conductive portions 22 are provided on the inner peripheries of the crimping pieces 27 of the collective barrel portions 25F, 25R, a state where the collective barrel portions 25F, 25R are in contact with the electrically conductive portions 22 via the protrusions 28 can be satisfactorily realized.

Second Embodiment

Figure 6:
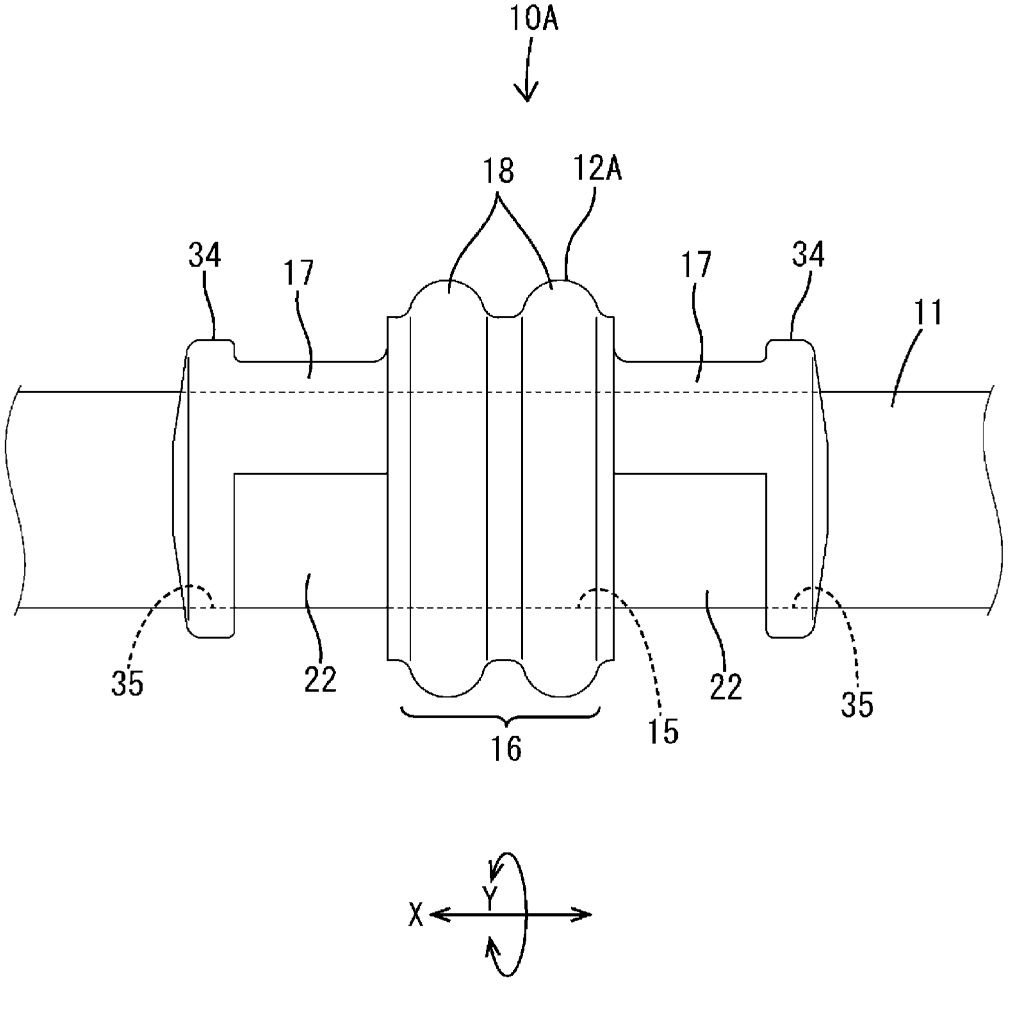
FIG. 6 is an enlarged side view of a main part of a rubber plug unit before connection of terminals in a second embodiment.
Figure 7:
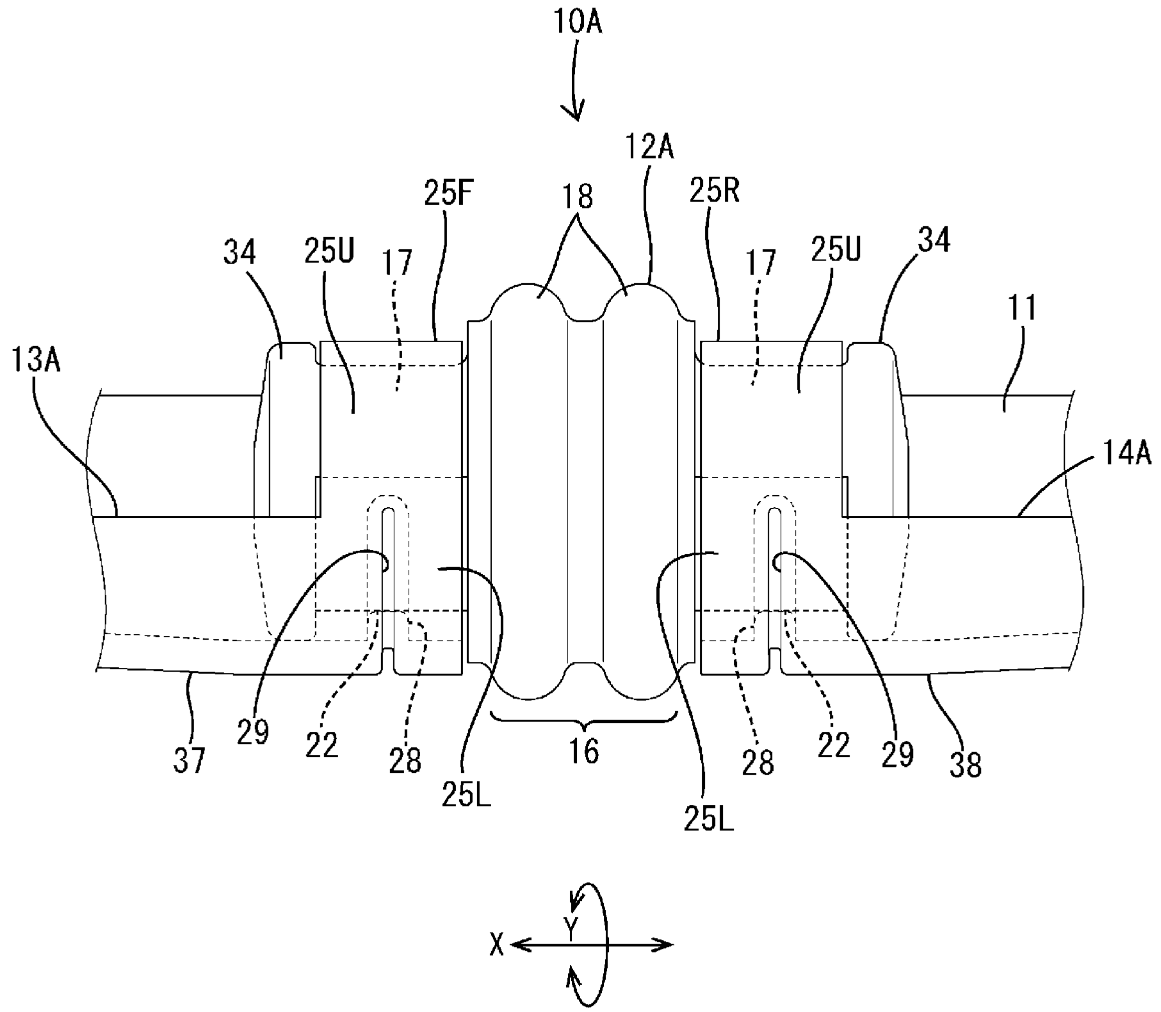
FIG. 7 is an enlarged side view of the main part of the rubber plug unit.

Next, a second embodiment is described using FIGS. 6 and 7. Note that, for the sake of convenience, structures same as or corresponding to those of the first embodiment are denoted by the same reference signs in the second embodiment.

In the case of the second embodiment, a rubber plug 12A includes a sealing body 16, a pair of holding portions 17 arranged to project toward both sides in the axial direction X of the sealing body 16 and a pair of insertion portions 34 connected to the tips of the respective holding portions 17 in projecting directions. The sealing body 16 has a hollow cylindrical shape and includes a sealing hole 15 penetrating in the axial direction X in a center. The insertion portion 34 is arranged to face at a distance from an end surface in the axial direction X of the sealing body 16. The insertion portion 34 has an annular shape and includes an insertion hole 35 at a position coaxial with the sealing hole 15. The holding portion 17 is provided to link an upper part of the outer periphery of the end surface in the axial direction X of the sealing body 16 and an upper part of each insertion portion 34. The holding portion 17 has an arcuate cross-section and is formed to have a fixed thickness in the axial direction X.

A connection terminal 13A and a joint terminal 14A include collective barrel portions 25F, 25R as in the first embodiment. Bead-like protrusions 28 extending in the circumferential direction Y are provided on the inner peripheries of the collective barrel portions 25F, 25R. Basic structures of the terminals 13A, 14A are similar to those of the terminals 13, 14 of the first embodiment. However, unlike the first embodiment, the protrusions 28 and recesses 29 are formed on the sides of bottom walls 37, 38 of the collective barrel portions 25F, 25R.

A central side in the axial direction X of the outer periphery of a wire 11 is arranged in close contact with the inner periphery of the sealing hole 15 of the sealing body 16. Both sides in the axial direction X of the outer periphery of the wire 11 are arranged in close contact with the inner peripheries of the insertion holes 35 of the insertion portions 34. Electrically conductive portions 22 are provided to be exposed in parts of the outer periphery of the wire 11 between the sealing body 16 and the insertion portions 34.

As shown in FIG. 7, the collective barrel portions 25F, 25R are arranged between the sealing body 16 and the insertion portions 34 in the axial direction X. Upper regions 25U of the collective barrel portions 25F, 25R are arcuately deformed along the outer peripheries of the holding portions 17 by crimping and held in close contact with the outer peripheries of the holding portions 17. The holding portions 17 are sandwiched and held between the collective barrel portions 25F, 25R and the wire 11. Lower regions 25L of the collective barrel portions 25F, 25R are arcuately deformed along a lower part of the outer periphery of the wire 11 by crimping, and the protrusions 28 are in close contact with the electrically conductive portions 22 of the wire 11. The electrically conductive portions 22 are electrically connected to the terminals 13A, 14A via the protrusions 28.

According to the second embodiment, since the electrically conductive portions 22 and the holding portions 17 are arranged to overlap in the axial direction X and the collective barrel portions 25F, 25R collectively surround the electrically conductive portions 22 and the holding portions 17 as in the first embodiment according to the second embodiment, a length of a rubber plug unit 10A in the axial direction X can be shortened.

Third Embodiment

Figure 8:
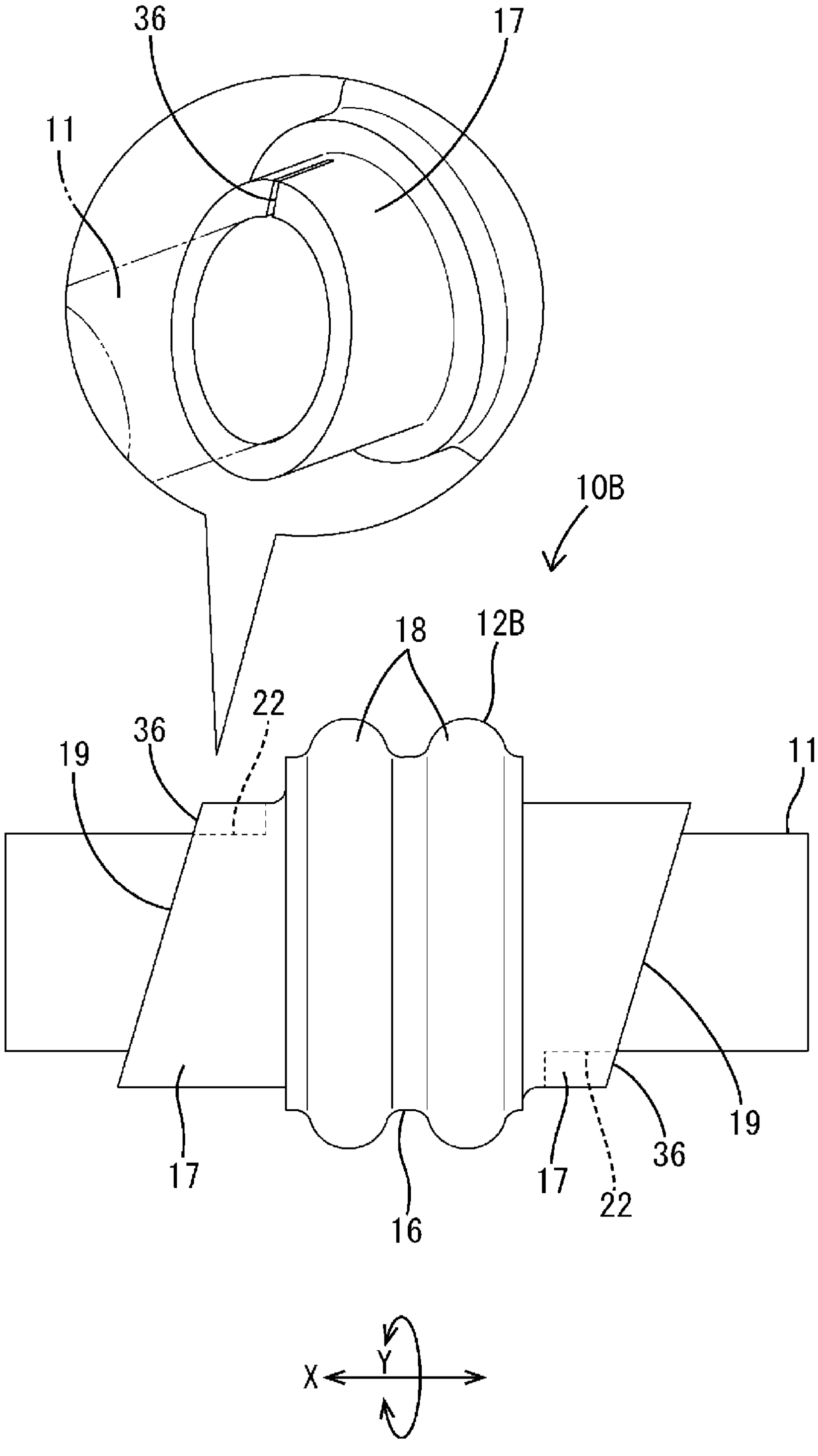
FIG. 8 is an enlarged side view of a main part of a rubber plug unit before connection of terminals in a third embodiment.

Next, a third embodiment is described using FIG. 8. Note that, for the sake of convenience, structures same as or corresponding to those of the first embodiment are denoted by the same reference signs in the third embodiment.

In the case of the third embodiment, a rubber plug 12B includes a sealing body 16 and a pair of holding portions 17 connected to both sides in the axial direction X of the sealing body 16. A basic structure of the rubber plug 12B is similar to that of the rubber plug 12 of the first embodiment. The shapes of inclined edges of the respective holding portions 17 are different from those of the first embodiment. Out of the respective holding portions 17, the holding portion 17 on one side (left side of FIG. 8) has an inclined edge 19 approaching the sealing body 16 from a lower end toward an upper end of FIG. 8. The holding portion 17 on the other side (right side of FIG. 8) has an inclined edge 19 approaching the sealing body 16 from the upper end toward the lower end of FIG. 8. Further, a cut portion 36 along the axial direction X is formed in an upper end part (end part on a shorter side) of the holding portion 17 on the one side. A cut portion 36 along the axial direction X is also formed in a lower end part (end part on a shorter side) of the holding portion 17 on the other side. The outer periphery of a wire 11 includes electrically conductive portions 22 inside the cut portions 36. The respective holding portions 17 are shaped point-symmetrically across the sealing body 16.

Unillustrated terminals include no parts corresponding to protrusions. The terminals are arcuately deformed along the outer peripheries of the holding portions 17 by crimping, and end parts (e.g. tip parts of crimping pieces) can enter the cut portions 36 and contact the electrically conductive portions 22 of the wire 11. Since the electrically conductive portions 22 and the holding portions 17 are arranged at positions overlapping in the axial direction X in the third embodiment as in the first embodiment, a length of a rubber unit 10B in the axial direction X can be shortened.

Other Embodiments

The embodiments disclosed this time should be considered illustrative in all aspects, rather than restrictive.

Although the wire is a single core wire having no insulation coating in the case of the first to third embodiments, the wire may be a single core wire including an insulation coating as another embodiment. If the wire is a single core wire including an insulation coating, electrically conductive portions may be provided on the outer periphery of the wire exposed by removing the insulation coating.

Although the wire is a single core wire in the case of the first to third embodiments, the wire may be such a flexible coated wire that a plurality of strands are surrounded with an insulation coating as another embodiment.

Although the terminals include the connection terminal and the joint terminal in the case of the first to third embodiments, only the connection terminal may be provided as another embodiment. In this case, the holding portion corresponding to the joint terminal can be omitted from the rubber plug. Further, in this case, the wire may be configured such that another connection terminal is coupled to an end part extending on a side opposite to the part to be coupled to the connection terminal.

Although the terminal contacts the electrically conductive portions of the wire via the protrusions in the case of the first and second embodiments, the terminal may be configured to contact the electrically conductive portions of the wire without tip parts of the crimping pieces or the like including the protrusions as another embodiment.

LIST OF REFERENCE NUMERALS

10, 10A, 10B . . . rubber plug unit
11 . . . wire
12, 12A, 12B . . . rubber plug
13, 13A . . . connection terminal (terminal)
14, 14A . . . joint terminal (terminal)
15 . . . sealing hole
16 . . . sealing body
17 . . . holding portion
18 . . . sealing lip
19 . . . inclined edge
21 . . . coupling edge
22 . . . electrically conductive portion
23 . . . body portion
24 . . . tab
25F, 25R . . . collective barrel portion
25L . . . lower region
25U . . . upper region
26 . . . lock receiving portion
27 . . . crimping piece
28 . . . protrusion
29 . . . recess
31 . . . wire barrel portion
32 . . . insulation barrel portion
33 . . . coated wire
34 . . . insertion portion
35 . . . insertion hole
36 . . . cut portion
37, 38 . . . bottom wall
70 . . . oil
80 . . . connector
81 . . . connector housing
82 . . . cavity
83 . . . fitting space
90 . . . case
95 . . . . O-ring
X . . . axial direction
Y . . . circumferential direction

What is claimed is:

1. A rubber plug unit, comprising:
a terminal configured to be inserted in a cavity of a connector housing;
a wire including an electrically conductive portion to be connected to the terminal; and
a rubber plug to be held in close contact with an outer periphery of the wire, the rubber plug including
a holding portion to be sandwiched between the terminal and the wire, and
a sealing lip provided on an outer periphery of the rubber plug and configured to be held in close contact with an inner periphery of the cavity,
the electrically conductive portion and the holding portion being arranged to overlap in an axial direction of the wire and being respectively arranged on both sides across the sealing lip in the axial direction of the wire.

2. The rubber plug unit of claim 1, wherein the wire is a single core wire.

3. The rubber plug unit of claim 1, wherein:
the electrically conductive portion and the holding portion are arranged side by side in a circumferential direction of the wire, and
the terminal includes a collective barrel portion for collectively surrounding the electrically conductive portion and the holding portion.

4. The rubber plug unit of claim 3, wherein
each of opposite sides of the holding portion in the axial direction of the wire is formed to have an inclined edge,
a protrusion is provided on an inner periphery of the collective barrel portion, and
the protrusion extends in the circumferential direction of the wire and is configured to contact a portion of the electrically conductive portion extending axially from the inclined edge of the holding portion.

5. A connector, comprising:
the rubber plug unit of claim 1; and
the connector housing,
wherein the rubber plug is inserted in the cavity of the connector housing together with the terminal.

6. The rubber plug unit of claim 2, wherein the terminal includes
a connection terminal capable of contacting a mating terminal, and
a joint terminal coupled to a flexible coated wire arranged outside the connector housing.

7. The rubber plug unit of claim 6, wherein
the connection terminal is connected to a part of the electrically conductive portion arranged on one side of the sealing lip, and
the joint terminal is connected to a part of the electrically conductive portion arranged on the other side of the sealing lip.

* * * * *